United States Patent [19]

Borburgh et al.

[11] 4,373,395
[45] Feb. 15, 1983

[54] APPARATUS FOR ULTRASONIC SCANNING

[75] Inventors: Jacques Borburgh, Poxdorf; Gerhard Naefe, Erlangen; Helmut Rost, Uttenreuth, all of Fed. Rep. of Germany

[73] Assignee: Siemens Aktiengesellschaft, Berlin & Munich, Fed. Rep. of Germany

[21] Appl. No.: 191,779

[22] Filed: Sep. 29, 1980

[30] Foreign Application Priority Data

Oct. 17, 1979 [DE] Fed. Rep. of Germany ....... 2942049

[51] Int. Cl.³ .......................................... G01N 29/00
[52] U.S. Cl. ..................................... 73/607; 73/625; 128/660
[58] Field of Search ................. 128/660, 661; 73/607, 73/619–620, 625–626; 358/112

[56] References Cited

U.S. PATENT DOCUMENTS

| | | |
|---|---|---|
| 4,127,034 | 11/1978 | Lederman et al. |
| 4,159,462 | 6/1979 | Rocha et al. |
| 4,167,753 | 9/1979 | Lynch ................................. 358/112 |
| 4,173,007 | 10/1979 | McKeighen et al. |
| 4,236,221 | 11/1980 | Cribbs et al. ........................ 128/660 |
| 4,245,250 | 1/1981 | Tiemann ............................. 358/112 |
| 4,267,584 | 5/1981 | McKeighen et al. ............... 128/660 |
| 4,285,011 | 8/1981 | Sato ...................................... 73/626 |
| 4,290,310 | 9/1981 | Anderson ............................. 73/626 |

OTHER PUBLICATIONS (Author Anon.), "Real Time UTS Diagnostic System For Simultaneous Image Displays", JEE Oct. 1979, pp. 66–69, vol. 16, #154.
Ito, K. et al., A New Real–Time UTS Diag. System for Dynamic & Still Images", JEE Japan No. 144, Dec. 1978. pp. 59–64.
Ophir, J. et al., "Digital Scan Converters in UTS Imaging", IEEE Proc., vol. 67, No. 4. Apr. 1979, pp. 654–664.

*Primary Examiner*—Lee S. Cohen
*Assistant Examiner*—Francis J. Jaworski
*Attorney, Agent, or Firm*—Hill, Van Santen, Steadman, Chiara & Simpson

[57] ABSTRACT

In the exemplary disclosure, the apparatus includes electronic delay circuitry for delaying echo signals produced in use by a multiplicity of transducers of the apparatus such that the phase relationship between respective echo signals is substantially maintained. The circuitry comprises a multiplicity of partial-line stores, each partial-line store being adapted for storing data corresponding to a part of an ultrasonic scanning line, associated in groups of at least three with respective ones of the transducers and control circuitry arranged such that, in use, data corresponding to echo signals (E(t)) is sequentially written in to the partial-line stores of the group (I, II, III) for each of the transducers, beginning with the first such transducer to receive an echo signal, until at least the first partial-line store (I) of the group (I, II, III) for the last such transducer to receive an echo signals has been supplied with data, after which, data can be simultaneously read out from all of the partial-line stores.

17 Claims, 4 Drawing Figures

APPARATUS FOR ULTRASONIC SCANNING

BACKGROUND OF THE INVENTION

This invention relates to ultrasonic scanning apparatus.

Ultrasonic apparatus is disclosed in Ultrasonics Symposium Proceedings, IEEE Cat. 1977, pages 250 to 254, which apparatus is provided with storage members as part of a delay device, the individual stores being whole-line stores, that is to say, they store an entire ultrasound line. The write-in and readout of a line takes place according to the so-called alternating buffer store principle, that is to say, data is read into one of two line stores just as data is being read out of the associated second store. The principle of such an alternating buffer store is also described inter alia in German Patent Specification No. 26 29 895. The use of whole-line stores, however, has the disadvantage that, where a relatively large number of transducer elements is present, an unnecessarily large amount of storage capacity is required.

SUMMARY OF THE INVENTION

According to the present invention there is provided ultrasonic scanning apparatus including electronic delay circuitry for delaying echo signals produced in use by a multiplicity of transducers of the apparatus such that the phase relationship between respective echo signals is substantially maintained, the circuitry comprising a multiplicity of partial-line stores, each partial-line store being adapted for storing data corresponding to a part of an ultrasonic scanning line, associated in groups of at least three with respective ones of the transducers, and control means arranged such that, in use, data corresponding to echo signals is sequentially written in to the partial-line stores of the group for each of the transducers, beginning with the first such transducer to receive an echo signal, until at least the first partial-line store of the group of the last such transducer to receive an echo signal has been supplied with data, after which, data can be simultaneously read out from all of the partial-line stores.

The control means is preferably arranged to produce a signal to enable the said simultaneous reading out of data from all the partial-line stores. This signal could be in the form of a pulse.

The storage capacity of each partial-line store could correspond at least to a maximum delay time before the said last such transducer receives an echo signal in use. In this case, the storage capacity of each partial-line store is preferably matched to the said maximum delay time, for scanning by pivoting of a beam produced by the ultrasonic scanning apparatus.

Alternatively, the minimum storage capacity of each partial-line store could be determined by a focus setting time of the ultrasonic scanning apparatus, for dynamic focusing of the apparatus. In this case, the storage capacity of each partial-line store, with a delay time of substantially zero before the said last such transducer receives an echo signal in use, could be adapted to set the value of the said focus setting time, for purely dynamic focusing of the apparatus. Alternatively, the minimum storage capacity of each partial-line store could also be determined by a maximum delay time before the said last such transducer receives an echo signal in use.

The ultrasonic scanning apparatus could further comprise means for processing digital signals. In this case, the partial-line stores could comprise random access memories. Also, the control means could then comprise a programmed device. In this case, the scanning apparatus could further comprise an address counter associated with the programmed device. A control pulse generator could be associated with the programmed device also. The control means could also comprise a further programmed device and a further address counter associated with such a further programmed device. The apparatus could also comprise an address adder associated with the further programmed device. This address adder could be arranged to control the partial-line stores via an address multiplexer.

The invention will now be described, by way of example, with reference to the accompanying sheets of drawings; and other objects, features and advantages will be apparent from this detailed disclosure and from the appended claims.

DETAILED DESCRIPTION

Figure 1:
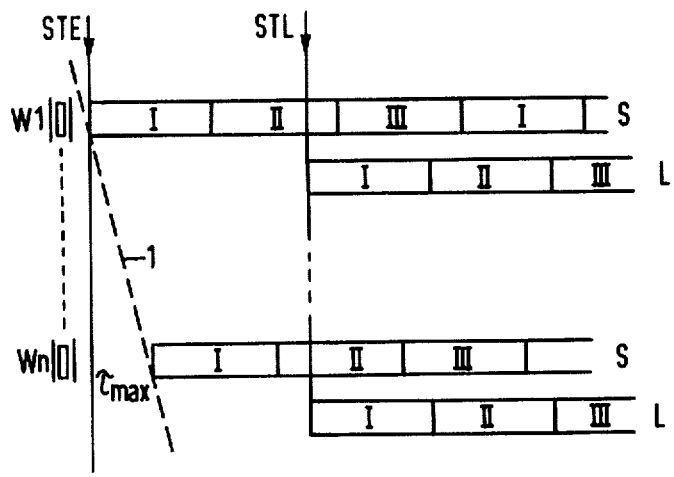
FIG. 1 is a diagrammatic illustration of the manner of operation of ultrasonic apparatus using pure beam pivoting with or without dynamic focusing.

Referring to FIG. 1, on the left-hand side of the diagram a transducer element array W1 to Wn is schematically indicated. Beam pivoting movement of the ultrasonic scanning apparatus in question is so chosen (as indicated by the dash delay line 1) that echo signals, received back after emission of transmitted signals, first arrive as data at the transducer element W1, whereas succeeding transducer elements W2, W3, etc., receive echo data only with increasing delay times. The last element Wn of the array of transducer elements receives, last of all the elements, echo data with a maximum time delay $\tau_{max}$. The scanning direction of the ultrasonic beam can be varied as desired (for example by programming). By appropriate preselection of different delay times, the angle of the chain delay line 1 is also varied, the main direction for radiation of the ultrasonic scanning rays being, of course, substantially perpendicular to this delay line 1. However, the whole arrangement is always such that the maximum delay time of that transducer element which is always the last to be reached in each instance (in the present case Wn, or W1 in the case of reflection of the direction of radiation at the axis of symmetry of the transducer element array W1 to Wn) does not exceed the pre-selected value $\tau_{max}$.

There is associated with each transducer element W1 to Wn of the transducer element array W1 to Wn a set of three partial-line stores of which each store only ever dynamically stores a predetermined fraction of a whole line (for example, one-sixteenth of a whole line). In FIG. 1, the partial-line stores of a set of three are respectively denoted by I, II and III. All of the partial-line stores of a set of three can be continuously and successively filled with data. The entry of data into the set of three is thus such that, commencing with the transducer element which is always the first to be reached by data in each instance (in the present case W1), the data of this element is sequentially read into the individual partial-line stores I, II and III until at least the first partial-line store I of the transducer element which is always the last to be reached by data (in the present case Wn) is filled with this data. In this case, a read-start pulse is produced as a result of which the data which has entered all of the partial-line stores is simultaneously read out.

In the diagram of FIG. 1, a start instant STE for writing-in S of data is indicated by the arrival of the first data at the first transducer element W1 of the transducer element array W1 to Wn. For each successive transducer element Wi, the writing-in S takes place with a delay in relation to the start instant STE corresponding to the delay time with which further data arrives. Finally, with regard to the last transducer element Wn, data is written into its first partial-line store I with a delay equal to the time $\tau_{max}$. However, when this first partial-line store I of the transducer element Wn has been filled, a read-start pulse for the simultaneous read-out L of data in all of the partial-line stores of all of the transducer elements W1 to Wn can be emitted. In FIG. 1, the start instant STL for the read-start pulse is somewhat delayed, because a setting time $\Delta F_{max}$ for the ultrasonic beam focus is included in the storage time. This additional time interval is always taken into consideration when dynamic focusing is performed simultaneously with pivoting movement of the ultrasonic beam.

Figure 2:
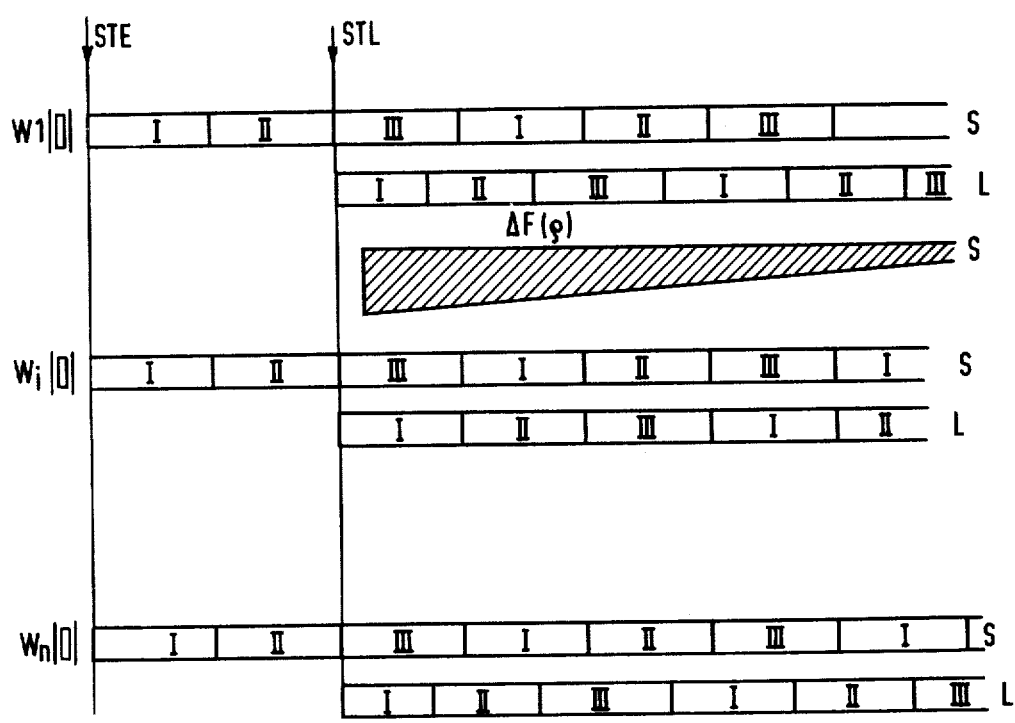
FIG. 2 is a diagram corresponding to the diagram of FIG. 1 for apparatus using only dynamic focusing.

Referring to FIG. 2, which relates to ultrasonic apparatus which used merely dynamic focusing without pivoting movement of the ultrasonic beam, in this case the delay time $\tau_{max}$ is 0 and only the aforesaid focus setting time $\Delta F_{max}$ becomes operative. This focus setting time $\Delta F_{max}$ varies in dependence upon the depth $\rho$ of the object being examined from which echo signals are to be sharply received (in focused form). The variation diagram for the focus setting time $\Delta F_{max}$ is diagrammatically shown as $\Delta F(\rho)$ in FIG. 2. On the basis of purely dynamic focusing, there is obtained for each difference in focus a different delay variation, for example in accordance with the curved chain line 2.

Figure 3:
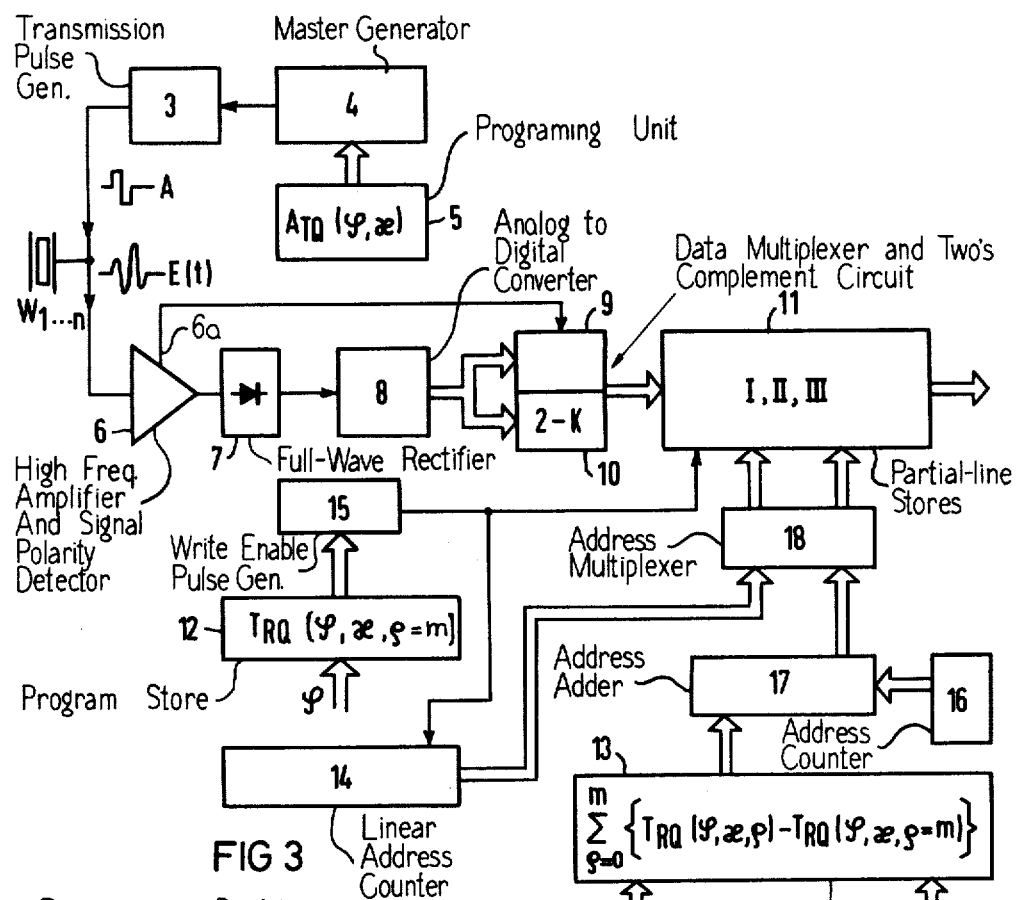
FIG. 3 shows a block circuit diagram of part of ultrasonic scanning apparatus associated with an individual transducer element.

In FIG. 3, a transmission pulse generator for generating ultrasonic transmission pulses A is denoted by the reference numeral 3. This transmission pulse generator 3 generates pulses A in step with trigger pulses produced by a master generator 4 which, in turn, is controlled by a programming unit 5 in which a transmission program is stored on demand in accordance with the relationship $A_{TQ}(\psi,\chi)$, where: A denotes the case of transmission; T denotes the respective transmission delay time; Q indicates that quantized values are present, $\psi$ is the pivoting angle of the ultrasonic radiation; and $\chi$ is the location of an activated transducer element in the transducer element array W1 to Wn. Ultrasonic echo signals in an object under examination produced as a result of the emission of a transmission pulse A from a transducer element or a group of transducer elements, and received back, are directed by a respective transducer element to a high-frequency amplifier 6 (80 dB amplifier) after having been reconverted into corresponding electrical signals E(t). The resulting amplified echo signals are then rectified by a full-wave rectifier 7 and the rectified signal is thereafter supplied, via an analog-to-digital converter 8, to a unit consisting of a combination of a data multiplexer 9 and a two's complement forming device 10. At the output of the combined unit 9 and 10 there is finally connected a set 11 of three partial-line stores I, II, III comprising three RAM stores which have a capacity of, for example, 256×8 bits.

The use of the combined unit comprising the data multiplexer 9 and the two's complement forming device 10 has the purpose that, in the visualisation of echo signals, there exists on the one hand a need for high image resolution. However, on the other hand, there are generally required for this purpose analog-to-digital converters having a high bit number, which are expensive. Optimum phase co-ordination of received echo signals after the delay has occurred is also required. A summing arrangement required for this purpose should be of simplest possible construction. These problems are solved in a surprisingly simple manner by the circuit arrangement 6 to 10. The solution proceeds from the fact that the echo signals produced contain both positive and negative components related to zero line potential. Accordingly, an analog-to-digital converter would have to convert the whole dynamic range from maximum negative amplitude to maximum positive amplitude, but for this purpose analog-to-digital converters having a relatively high bit number would be required to make it possible to achieve an acceptable image resolution value. However, very much more favourable conditions arise if an echo signal produced is rectified before conversion to digital form. After rectification, the resolution is concentrated only on signal components of a single polarity. With an equally good degree of image resolution, one less bit is thereby required. In this way, the bit number which the analog-to-digital converter requires for the same image resolution is also reduced by one bit and the converter thus becomes cheaper. Since rectification at the same time also involves loss of sign, however, it must be ensured that a sign signal is formed, which sign signal must appear throughout further signal processing as far as a summing device as an accompaniment to the signal components to be processed and which finally re-unites the components with the correct sign before image display. There can be utilized as the carrier of the sign information in a simple, optimum and surprising manner, the one bit which now need not be generated by the analog-to-digital converter, but instead is directly formed by a sign detector and can be utilised to carry the sign information. In the circuit diagram of FIG. 3, the amplifier 6 is accordingly simultaneously constructed as a sign detector for positive and negative components of the echo signals E(t) produced. Depending upon the sign detected, there is generated a signal which controls, via a sign signal line 6a, the combination of the multiplexer 9 and the two's complement forming device 10 in the sense of a routing device for the signal produced by the analog-to-digital converter 8. The amplifier 6 operates to generate a sign signal in the form of a sign bit only in the presence of negative components of the echo signals E(t) and then supplies the sign bit via the line 6a to the multiplexer 9 and the two's complement forming device 10. The two devices 9 and 10 are then operated in dependence upon the sign signal in such manner that, when there is no signal in the line 6a, i.e. in the presence of positive signal components, the output information of the analog-to-digital converter 8 is directly passed on, with the sign bit, to the set of three partial-line stores 11 via the data multiplexer 9. On the other hand, when negative components are detected, the output information of the analog-to-digital converter 8 is switched-over to the input of the two's complement forming device 10 by means of the signal which is then present on the line 6a in each instance. The twwo's complement forming device 10 then forms the two's complement in formation 2-K to the output information of the analog-to-digital converter 8 and passes on the two's complement information(2-K) together with the sign bit to the set of three partial-line stores 11. The delay here takes place in the modes of operation already described in the foregoing with reference to FIGS. 1 and 2. The respective function is again controlled by program stores 12 and/or 13 which separately control each set of three partial-line stores 11 in combination with address counters and release (enabling) devices. In the circuit diagram of FIG. 3, the block 14 represents a linear address counter for writing-in S and the block 15 represents a generator for producing writing enable pulses. Correspondingly, the block 16 represents an address counter for reading-out, the block 17 represents an address adder, and the block 18 represents an address multiplexer for seeking the addresses for writing-in S and reading-out L. The program store 12 specifically supplies data for the setting of delay times in accordance with the relationship: $T_{RQ}(\psi,\chi,\rho=m)$; where: T is again the delay time; R represents the case of reception; Q again means that quantised values are present; $\psi$ is again the pivoting angle; and $\chi$ is the location of the activated transducer element on the row of transducer elements W1 to Wn. The parameter $\rho$ defines the depth of penetration and m, the last of a given number 0 to m of focusing ranges which can be set stepwise throughout the range of examination depths. The program store 13, on the other hand, makes available control programs for dynamic focusing when these are required. The program for dynamic focusing is built-up in accordance with the relationship:

$$\sum_{\rho=0}^{m} \{T_{RQ}(\phi, H, \rho) - T_{RQ}(\phi, H, \rho = m)\}.$$

It is possible to either use both programming stores 12 and 13 in combination, or to use only one of them without activation of the other.

Figure 4:
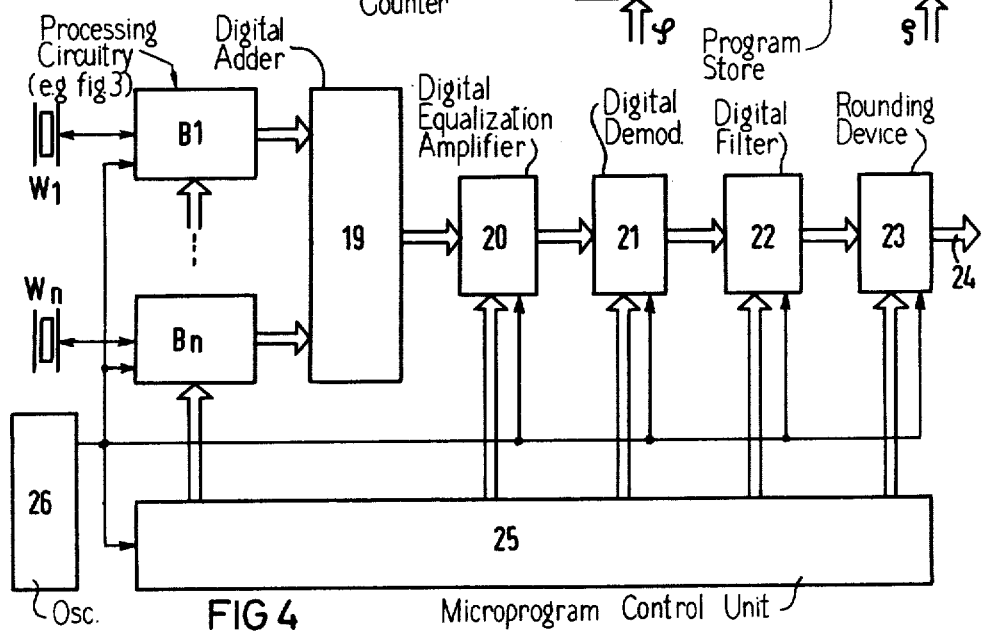
FIG. 4 shows a block circuit diagram of the same ultrasonic scanning apparatus for a whole array of transducer elements.

The basic circuit for the further processing of signals emanating from each individual transducer element W1 to Wn, in such a manner that they are united in correct phase, is illustrated in FIG. 4. In this figure, the whole row of all the transducer elements is again indicated by W1 to Wn. Each transducer element is succeeded by a block B1 to Bn, each of which is built-up in accordance with the circuitry shown in the circuit diagram of FIG. 3. The outputs of all of the blocks B1 to Bn are connected with a digital adder 19 for adding their output signals. On the basis of the previously explained selection of the combination of the multiplexer 9 with the two's complement forming device 10, the digital adder 19 can be designed in a particularly simple manner as a simple summing circuit. Without the use of the two's complement forming device 10, on the other hand, it would be necessary to form both sums and differences, whereby the cost of the adder 19 would be considerably increased. A pure summation is possible because, as already explained, each negative component of the echo signals E(t) carries with it the information of the minus sign as a result of the two's complement formation. After a simple addition has been performed, the resulting signal is supplied to a succeeding network comprising a digital equalization amplifier 20 and a digital demodulator 21. The resulting demodulated digital signals are then finally directed via a digital filter 22 to a rounding device 23 for bit number reduction. The data-reduced signal obtained at the output of the rounding device 23, which converts 11-bit data into 8-bit data, is then passed in the direction of the arrow 24, for example via image stores (not shown) or the like, to an image display tube (not shown) for display. The control of the blocks B1 to Bn and 19 to 23 in FIG. 4 takes place by means of a microprogram control unit 25, which also permits variations of the program for the operation of the blocks B1 to Bn. The central clock is an oscillator 26.

The storage capacity of a partial-line store depends substantially only upon the maximum delay time $\tau_{max}$ of the transducer element array W1 to Wn. Since the delay time $\tau_{max}$ is generally very small even with large pivoting angles—it amounts to a fraction, for example 1/16 or even less, of the total storage time of a whole-line store; the storage time required is always relatively small and hence the storage capacity of the partial-line store involved is always optimally low. Consequently, with a large number of transducer elements in the transducer element array W1 to Wn, the total requirement of storage capacity is optimally low.

The arrangement described may be applied to so-called phased arrays, for example for carrying out sector scanning by beam pivoting on the basis of differing signal delay. Application in combination with dynamic focusing or to linear arrays without beam pivoting, but with dynamic focusing, is equally possible as described.

Using digital techniques has the advantage that the whole arrangement can be controlled on a software basis. This not only renders possible trouble-free and rapidly variable control, but since no analog ultrasonic signals have to be dealt with anywhere in the control circuitry (as, for example, in the LC technique), no small switching clicks occur which act as disturbing echoes in the image. Also, stability is further enhanced in comparison with CCD stores (charge coupled devices) or BBD stores (bucket brigade devices or bucket chain stores).

It will be apparent that many modifications and variations may be effected without departing from the scope of the novel concepts and teachings of the present invention.

We claim as our invention:

1. Ultrasonic scanning apparatus including electronic delay circuitry for delaying echo signals produced in use by a multiplicity of transducers of the apparatus such that the phase relationship between respective echo signals is substantially maintained for each of a succession of ultrasonic scanning lines, the circuitry comprising a multiplicity of partial-line digital stores, each partial-line digital store being adapted for storing data in digital form corresponding to a part of an ultrasonic scanning line, a group of partial-line digital stores being associated with each of the transducers such that the total number of partial-line digital stores available for association with each transducer has a total storage capacity substantially less than that required for storing the data from the transducer which is to be stored during the generation of an ultrasonic scanning line, each group comprising at least three partial-line digital stores and being operated such that readout of part of the data of one ultrasonic scanning line makes room for the storage of a further part of the data of the same ultrasonic scanning line, and control means arranged such that, in use, data corresponding to echo signals is sequentially written in to the partial-line digital stores of the group for each of the transducers, beginning with the first such transducer to receive an echo signal, until at least the first partial-line digital store of the group for the last such transducer to receive an echo signal has been supplied with data, said control means being operative for simultaneously reading out stored data from all of the groups of partial-line digital stores after the time when the group of partial-line digital stores for the last such transducer to receive an echo signal has been supplied with data and before the group of partial-line digital stores associated with the first such transducer to receive an echo signal has exceeded its storage capacity.

2. Ultrasonic scanning apparatus according to claim 1, wherein the control means is arranged to produce a signal to enable the said simultaneous reading-out of data from all of the partial-line stores.

3. Ultrasonic scanning apparatus according to claim 2, wherein the said signal is in the form of a pulse.

4. Ultrasonic scanning apparatus according to claim 1, wherein the storage capacity of each partial-line store corresponds at least to a maximum delay time before the said last transducer receives an echo signal in use.

5. Ultrasonic scanning apparatus according to claim 4, wherein the storage capacity of each partial-line store is matched to the said maximum delay time, for scanning by pivoting of a beam produced by the ultrasonic scanning apparatus.

6. Ultrasonic scanning apparatus according to claim 1, wherein the minimum storage capacity of each partial-line store is determined by a focus setting time of the ultrasonic scanning apparatus, for dynamic focusing of the apparatus.

7. Ultrasonic scanning apparatus according to claim 6, wherein the storage capacity of each partial-line store, with a delay time of substantially zero before the said last transducer receives an echo signal in use, can be adapted to set the value of the said focus setting time, for purely dynamic focusing of the apparatus.

8. Ultrasonic scanning apparatus according to claim 6, wherein the minimum storage capacity of each partial-line store is also determined by a maximum delay time before the said last transducer receives an echo signal in use.

9. Ultrasonic scanning apparatus according to claim 1, comprising means for processing digital signals.

10. Ultrasonic scanning apparatus according to claim 9, wherein the partial-line stores comprise random access memories.

11. Ultrasonic scanning apparatus according to claim 9, wherein the control means comprises a programmed device.

12. Ultrasonic scanning apparatus according to claim 11, further comprising an address counter associated with the programmed device.

13. Ultrasonic scanning apparatus according to claim 11, further comprising a control pulse generator associated with the programmed device.

14. Ultrasonic scanning apparatus according to claim 11, wherein the control means comprises a further programmed device.

15. Ultrasonic scanning apparatus according to claim 14, with an address counter, associated with each programmed device.

16. Ultrasonic scanning apparatus according to claim 14, further comprising an address adder associated with the further programmed device.

17. Ultrasonic scanning apparatus according to claim 16, wherein the address adder is arranged to control the partial-line stores via an address multiplexer.

* * * * *